United States Patent Office 3,483,376
Patented Dec. 9, 1969

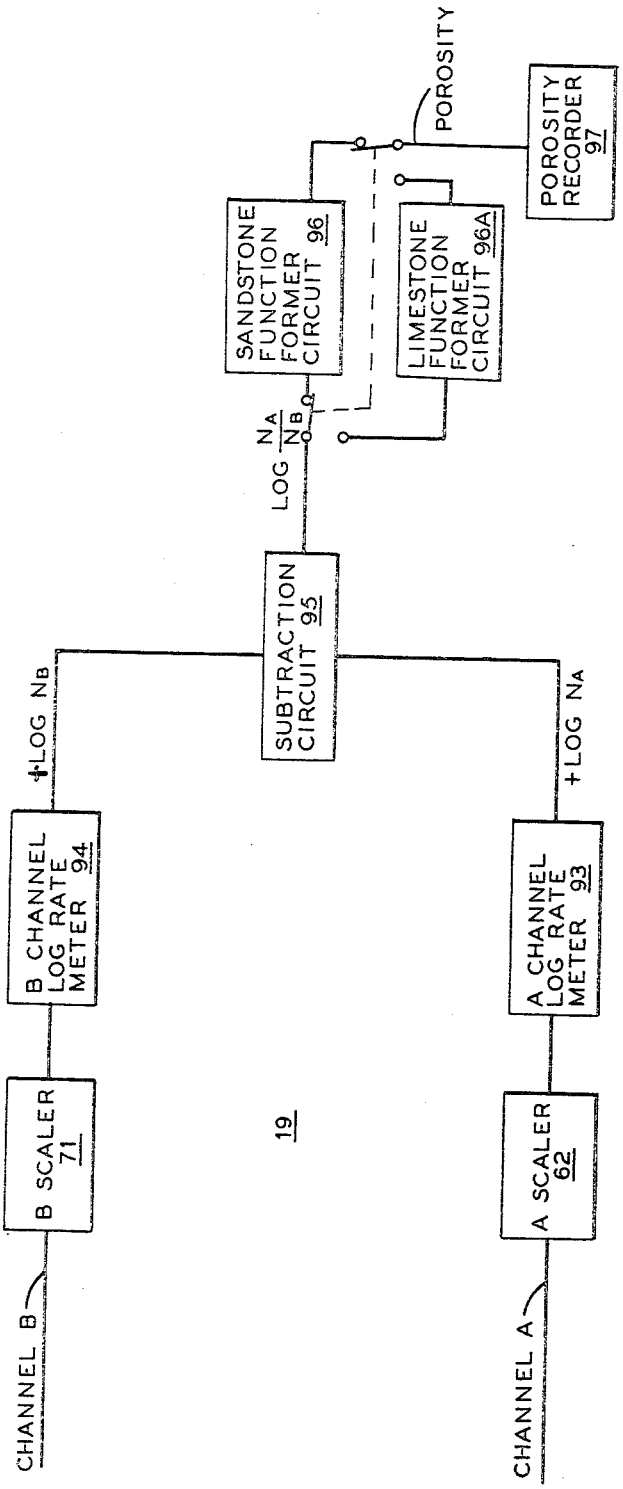

3,483,376
TWO NEUTRON DETECTOR EARTH FORMATION
POROSITY LOGGING TECHNIQUE
Stanley Locke, Norwalk, and Harold Sherman and John
S. Wahl, Ridgefield, Conn., assignors to Schlumberger
Technology Corporation, Houston, Tex., a corporation of Texas
Filed Aug. 3, 1966, Ser. No. 570,068
Int. Cl. G01t 3/00, 1/16; H01j 39/32
U.S. Cl. 250—83.1                                6 Claims

ABSTRACT OF THE DISCLOSURE

A typical embodiment of the invention comprises an earth formation porosity logging tool for use in open and cased boreholes. The tool contains a chemical neutron source spaced from a first helium-3 neutron detector. A second helium-3 detector is relatively more sensitive to neutrons than the first detector and is spaced vertically from the neutron source a distance at least equal to the spacing between the source and the opposite end of the first detector. This increased relative neutron response characterizing the second detector enhances the tool counting statistics and reduces the disparity between the signal intensities from both of the detectors, in spite of the smaller neutron population at the greater distance from the source. A circuit is coupled to the counters in order to convert the detector signals into a signal that corresponds to the formation porosity.

This invention relates to well logging methods and apparatus and, more particularly, to methods and apparatus for computing the porosity of the earth formations surrounding a borehole by irradiating the formations with neutrons and measuring the resulting spatial distribution of the neutrons within the formation, and the like.

A knowledge of the porosities of the formations surrounding a borehole is of fundamental importance in the oil industry. Porosity data is needed not only to identify possible oil or gas producing horizons but also to calculate other important parameters, such as the maximum producible oil index of a specific formation. In principle, a neutron-emitting sonde, or tool, which is drawn through a borehole should provide this needed porosity information. Such a tool would irradiate the surrounding earth formations and establish a radiation pattern that uniquely identifies the porosity of a particular formation.

In the field, however, accurate porosity determination through nuclear well logging techniques is hampered by practical considerations. For example, the presence of steel borehole casing, drilling fluid, cement, caving, and other "borehole effects" can degrade the accuracy of any data acquired without the aid of some corrective technique.

Because the neutrons radiating from the sonde tend to spread throughout a formation, it has been proposed to use equipment that measures this diffusion through the formation as a function of time to overcome the undesirable influence of these borehole effects. Accordingly, one class of possible neutron logging equipment radiates bursts of neutrons into the adjacent formation and measures the subsequent decline in the neutron population with the passage of time. Because the neutrons in the bursts collide with the nuclei that comprise the formation materials, a gamma ray flux is induced in the formation that may be proportional to the time distribution of the irradiating neutrons. Consequently, these devices observe the decrease in neutron population by detecting the magnitude of the gamma ray flux at the logging tool during two sampling intervals taken between each irradiating burst. The logarithm of the ratio of these time-separated gamma ray counting rates would often enable a porosity-dependent parameter, such as the macroscopic neutron capture cross section, to be computed for the formation. This parameter would provide some indication of formation porosity. Moreover, by deliberately delaying the gamma ray sampling intervals until the more rapidly decaying induced activity in the borehole has dissipated, the longer lasting gamma ray activity induced in the formation can be measured directly and thus mitigate some of the aforementioned borehole effects.

By relying on an analysis of the neutron distribution within the formation as a function of time, these proposed tools are confronted with transient conditions. These transients can introduce uncertainties into the data interpretation. In such cases, these uncertainties can be compensated in part by varying the radiation sampling times in accordance with the nature of the particular formation under study. This need for precise and selectively timed operation usually imposes a requirement for expensive timing circuits and careful circuit operation and maintenance.

Time, however, is not the only factor that can be varied to obtain an analytical description of the distribution of the irradiating neutrons in a formation. The neutron population also can be characterized spatially or in terms of distance.

Thus, it is an object of the invention to provide a reliable and relatively inexpensive logging tool for measuring the spatial distribution of the neutron population in earth formations.

It is another object of the invention to measure formation parameters in terms only of the spatial distribution of an irradiating neutron flux in a manner that is substantially independent of time as a measurement factor.

It is another object of the invention to provide a novel arrangement of neutron detectors that produce statistically valid accumulations of counts characterizing the spatial distribution of the neutron population in the formations surrounding a borehole.

It is still another object of the invention to continuously irradiate the formations surrounding a borehole with neutrons and through the spatial distribution of the irradiating neutrons, determine the porosity of the formations.

It is a further object of the invention to provide an accurate and inexpensive means for computing formation porosity by taking a digitally stored accumulation of neutron detector pulses characterizing the neutron population at one position in a formation and directly converting these pulses to an analog signal whenever the detector pulses characterizing the neutron population at another position in the formation reach a predetermined value.

Accordingly, in one illustrative embodiment of the invention the spatial distribution in an earth formation of the neutrons emitted from a continuously radiating source is measured by two neutron detectors spaced at different distances from the source.

By recording the accumulated counts registered with the detector nearest the neutron source each time the far detector registers a predetermined number of counts, a ratio automatically is struck. This ratio describes the porosity-dependent change in the irradiating neutron population as a function of detector spacing. The description of the neutron distribution obtained in the foregoing manner eliminates time and complicated timing circuits as a measurement factor.

Alternatively, with two neutron detectors and a continuously emitting neutron source arranged in the aforementioned manner, two logarithmic rate meters, each having the same time constant, can be used to convert the neutron events registered in respective detectors into logarithms of detector count rates. A conventional subtraction circuit can be provided to take the difference between these two logarithmic values and thereby provide the ratio that defines the rate of the exponential decay in the neutron population with increasing distance from the neutron source.

Because neutron absorption in the hydrogenous drilling fluid is high relative to most earth formations, the mean free path of the portion of the irradiating neutron flux diffusing through the borehole is quite short compared to the mean free path of the neutrons diffusing through the adjacent earth formations. Consequently, by spacing the detectors from the neutron source a distance greater than several mean free paths for neutrons in drilling fluid, the neutrons reaching the detectors are those which characterize the spatial distribution of the neutrons within the formation. Thus, some borehole effects are reduced substantially by appropriately spacing the neutron detectors to enable most of the neutrons within the drilling fluid to be absorbed before reaching the detector.

More particularly, an ordinary chemical source of neutrons is located preferably at one end of the sonde. Two $He^3$ neutron detector tubes exhibiting a low sensitivity to gamma radiation are positioned within the sonde at different distances from the neutron source. The center of the effective volume of the detector nearest to the source may be spaced twenty or more centimeters from the effective center of the neutron source in order to take advantage of the aforementioned absorption characteristics of the drilling fluid.

The neutron population within the formation nevertheless does decay rapidly with separation from the source. Accordingly, to satisfy counting statistics requirements, which will be described subsequently, the neutron detector spaced furthest from the source must be as sensitive to neutrons as the dimensional limitations of the sonde will permit. Moreover, the near detector which measures a much larger neutron population has less difficulty in satisfying counting statistics requirements and may be less sensitive to neutrons than the far detector. In order to subtract the logarithms of these two detector count rates in accordance with one embodiment of the invention, the logarithmic rate meters must have the same time constant for computing counting rates. This time constant must be the same in spite of the substantial difference in detector sensitivities so that the time base common to both count rates is eliminated in the subtraction.

The present invention, both as to its organization and manner of operation, together with further objects and advantages thereof, may best be understood by reference to the following description taken in connection with the accompanying figures of the drawing, in which:

FIGURE 3 is a block diagram of an alternative electrical circuit for computing formation porosity.

Figure 1:
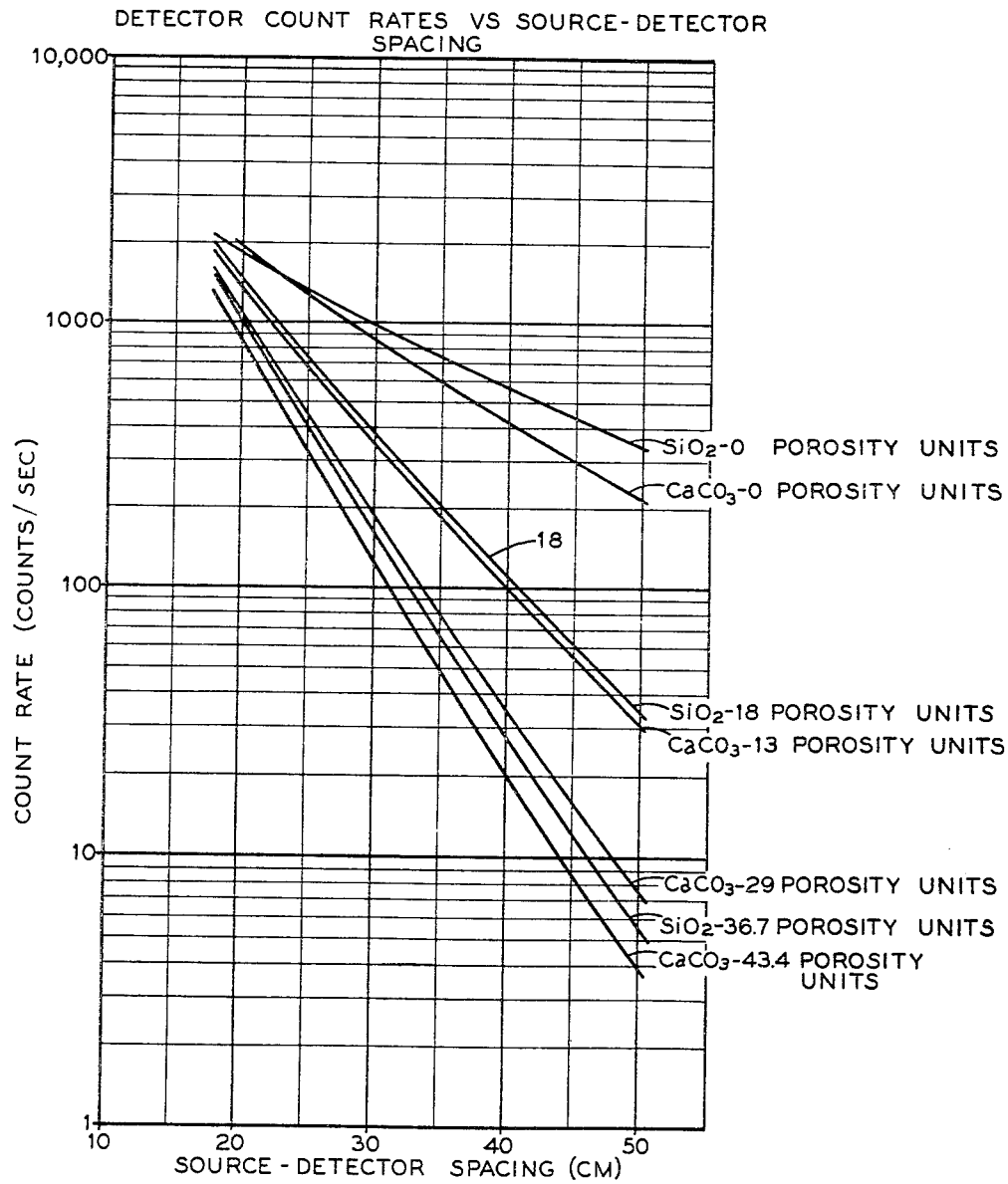
FIGURE 1 is a representative semi-logarithmic graph of count rate as a function of source-to-detector spacing.

In order to more fully appreciate the principles and advantages of the present invention, a family of curves showing the logarithm of neutron detector count rate in sand ($SiO_2$) and limestone ($CaCO_3$) formations of different porosities as a function of source-detector spacing in an uncased borehole is shown in FIGURE 1. The logarithm of the count rate for each formation plotted in FIGURE 1 decreases with increasing separation between the source and the detector. A distinctive characteristic of these curves is the progressive increase in curve slope with increasing porosity for the sand and limestone formations. This phenomenon also is observed in other earth formations of interest, such as shale and dolomite. Accordingly, if the specific earth formation can be determined by a known technique, for example through examining drill cuttings, the count rates registered by two radiation detectors spaced at different distances in the range between 20 and 50 centimeters (cm.) from a neutron source within the formation should identify a curve that has a slope unique to a specific formation porosity.

Thus, for example, two neutron detectors in a sand formation spaced 25 cm. and 50 cm. from a neutron source and yielding count rates of 700 counts per second (c.p.s.) and 33 c.p.s. respectively, indicate that the sand has the porosity indicated by the slope of curve 18, in particular, a porosity of 18 porosity units, as shown. The FIGURE 1 curves of count rate and detector spacing are determined by laboratory or field tests on formation specimens of known composition and known porosity. Clearly, the validity of the porosity determination depends on establishing a time-stabilized or steady state neutron flux condition within the formation. In a steady state condition the rate of dissipation of the irradiating neutrons is in balance with the neutron input to the formation from the neutron source.

Analytically, the detector count rate N due to neutrons radiating from a point source in an infinite formation is determined by the equation $$N = \frac{1}{4\pi D} \frac{e^{-\frac{R}{L}}}{R}$$

where D is the diffusion coefficient for the formation; L is the formation diffusion length; e is the natural logarithm base; and R is the source-detector spacing.

By taking the logarithmic derivative of the count rate N with respect to a change in the source-detector spacing R $$\frac{\partial}{\partial R} \ln N = \lim_{h \to 0} \frac{\ln N(R+h) - \ln N(R)}{h} = -\frac{1}{L} - \frac{1}{R}$$

where $h$ is the incremental change in spacing between the source and the detector. The logarithmic derivative of the count rate N then reduces to the following expression $$\frac{\partial}{\partial R} \ln N \approx \frac{1}{h} \ln \frac{N(R+h)}{N(R)} \approx -\frac{1}{L} - \frac{1}{R}$$

Clearly this analysis indicates that the change in detector count rate as a function of separation from the neutron source when measured by the logarithm of the ratio of the count rates observed at distances R and $R+h$ from the source is a function of the reciprocal of the diffusion length L. The diffusion length L, as noted previously, is unique to a specific porosity for any given formation. Thus, if the formation is known and L can be computed through the logarithm of the spaced detector count rates, the porosity of the formation necessarily is determined. This particular quantity, moreover, when measured in the manner described herein is substantially independent of the aforementioned borehole effects such as cement thickness.

Figure 2:
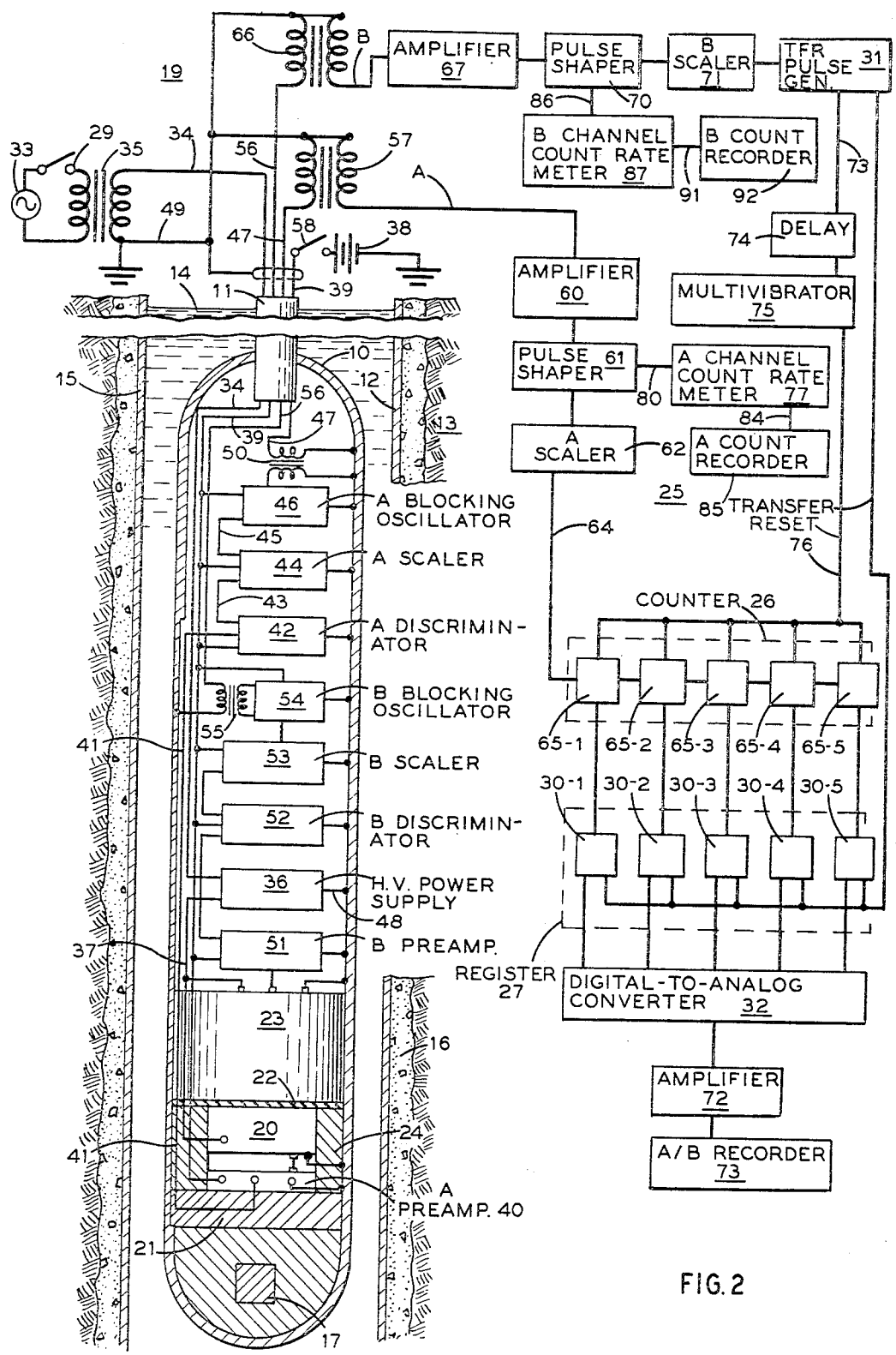
FIGURE 2 is a schematic diagram of a tool embodying the principles of the invention, showing the electrical circuits in block diagram form.

An illustrative embodiment of a practical apparatus for identifying formation porosity in accordance with these principles is shown in FIGURE 2 of the drawing.

A fluid-tight pressure resistant housing 10 is suspended by an armored cable 11 in a borehole 12. As will be described later in detail, cable 11 may comprise a group of insulated conductors that electrically connect the equipment within housing 10 with surface apparatus 19. A winch (not shown) located at the surface of the earth is utilized to lower and raise the apparatus in the borehole in the customary manner to traverse earth formations 13. The borehole 12 may be dry or may be filled with water-base or oil-base drilling mud 14 as shown. Borehole 12 may be uncased, or it may be lined with one or more strings of iron casing 15 surrounded by annuli of concrete 16, also as shown. Supported in the lowermost end of the housing 10 is a five curie source 17 for continuously radiating neutrons which may be comprised of a mixture of a plutonium and beryllium or americium and beryllium.

A neutron detector 20 containing an He$^3$ filling gas at a pressure of four atmospheres is axially spaced from the source by a neutron shield 21 of boron carbide or the like. Detector tube 20 is of the type which includes a hollow cylindrical cathode surrounding a centrally disposed anode wire (not shown). The volume between these electrodes is filled with gaseous He$^3$, so that the irradiating neutrons which collide with the He$^3$ atoms in the gas initiate nuclear reactions. Each reaction causes some filling gas ionization which produces an electrical charge pulse in the electrodes that is representative of the reaction energy. Detector tube 20, for example, may be 7¼ inches in length and 1¾ inches in diameter such that the transverse area of the detector tube 20 is substantially less than the corresponding transverse area of the housing 10. The annulus formed between detector tube 20 and housing 10 is occupied by a sleeve 24 of aluminum, or some similar material that is transparent to neutrons. Separated from detector tube 20 by a thin washer 22 of ⅛ inch thick neoprene is neutron detector tube 23.

Detector tube 23, which is generally similar to neutron detector tube 20, also is a four atmosphere He$^3$ device. Moreover, tube 20 and 23 are positioned in end-to-end abutting relation as shown in FIGURE 2. Because of the larger active volume, tube 23 is more sensitive to neutrons than tube 20 and in the embodiment shown has a length of 9¼ inches and a diameter of 2¾ inches. The diameter of the tube 23 is substantially coextensive with the corresponding diameter of the housing 10. Accordingly, tube 23 is as large as the physical limitations of the housing 10 will permit in order to accommodate the largest possible volume of filling gas and thereby provide the maximum neutron sensitivity attainable within the constraints imposed by a reasonable housing diameter.

This arrangement of nested detectors having different sensitivities is provided to compensate for the exponential decrease in neutron population with separation from the source 17 shown by the curves in FIGURE 1. The decrease in the neutron population in a formation can be understood better if the spatial distribution of a neutron flux is considered in analytical terms. Illustratively, the decrease in neutron flux with distance can be expressed very generally by $$\frac{I}{I_0} = e^{-\frac{x}{\lambda}}$$

where $I_0$ is the neutron flux at the source; $I$ is the neutron flux at detector 23; $e$ is the natural logarithm base; $\lambda$ is the mean free path of the neutron flux in the formation; and $x$ is the source-to-detector distance. Clearly, the exponential factor decreases rapidly with increasing detector separation from the source 17 so that the neutron flux is quite small beyond a few mean free paths. Thus, for example, if a separation $x$ is chosen as equal to three times the mean free path, $$x = 3\lambda$$

the neutron flux at the detector 23 is reduced to five percent of the flux at the source because $$\frac{I}{I_0} = e^{-\frac{x}{\lambda}} = e^{-\frac{3x}{\lambda}} \approx 0.05$$

This rapid decrease in neutron flux strength establishes a critical problem in detector counting statistics. A failure on the part of detector 23 to respond to a sufficiently large number of neutron events ultimately will increase the error in the computed formation porosity.

Illustratively, in counting statistics counting error generally varies in accordance with the equation $$S/n \approx \frac{1}{\sqrt{n}}$$

where $S/n$ is the root-mean-square of the deviations of actual measurements from the average and $n$ is the number of events recorded in a particular measurement. Thus, if the neutron flux is to be measured with an accuracy of one percent, the relative deviation $S/n$ is about 0.01. Consequently, 10,000 nuclear events must occur within the detector to produce the desired one percent accuracy. Considering the range of mean free paths characterizing ordinary earth formations which may vary from about 6.6 cm. in salt water to 18.5 cm. in zero porosity sandstone, and the demonstrated effect of this parameter on reducing the neutron population, it is plain that the location and sensitivity of the detector 23 is important. For example, the effective center of the volume of active filling gas in detector 23 is spaced about 42 cm. from the effective center of the neutron source 17. As shown in FIGURE 1, this detector would respond to neutrons at a rate of 85 c.p.s. in a typical sand formation of 18 porosity units. Accordingly, to produce a satisfactory degree of statistical accuracy within a reasonable time, detector 23 must be made as neutron sensitive as possible. Detector 20, however, in the same formation, and spaced approximately 23 cm. from the source 17 should produce 900 c.p.s. Consequently, detector 20 which is exposed to a neutron flux at least ten times greater than detector 23 need not be as neutron sensitive as detector 23.

As shown in FIGURE 2, electrical pulses from detector 20 caused by reactions between the He$^3$ filling gas and the irradiating neutrons scattered back to the detector from the formation 13 are transmitted through channel A in cable 11 to the surface apparatus 19. Similarly, a lesser number of pulses from the detector 23 also are transmitted through channel B in cable 11 to the surface apparatus 19. The more abundant pulses characterizing are larger neutron population observed by the detector 20 are transmitted through channel A to the computational circuits 25 where the pulses are received in a counter 26, which keeps a running tabulation of the total number of the A channel pulses. Simultaneously, the lesser number of pulses from the detector 23 are transmitted through channel B to a transfer pulse generator 31. The transfer pulse generator can be, for example, a multivibrator triggered by a pulse output from a linear amplifier (not shown).

In response to a predetermined number of pulses in channel B the transfer pulse generator 31 transmits a shift signal that causes the sum of the A channel counts stored in the counter 26 to be transferred to a register 27 where it is stored, while counter 26 is reset by a slightly delayed pulse from delay circuit 74 and multivibrator 75. A voltage proportional to the digital number in register 27 is provided by digital to analog converter 32. Converter 32 may be a resistance matrix that changes the digital information stored in the register 27 into an analog signal which has an amplitude that is directly proportional to the sum of the counts tabulated by register 27.

This specific feature of the invention automatically strikes a ratio between the neutron population detected by detector tube 20 and the neutron population detected by tube 23. This ratio describes the decrease in the neutron density as a function of the spatial distribution of the irradiating neutrons in a manner that is independent of any consideration of time or detector count rates.

In operation, the direct current potential required for the operation of detector tubes 20 and 23 is drawn from alternating current generator 33 on the surface of the earth. The generator is connected through switch 29 and transformer 35 to lead 34 in the cable 11. The alternating current on lead 34 is converted by a high voltage power supply 36 within housing 10 into a direct current detector tube operating potential of, for example, 1,000 to 1,100 volts.

The power supply 36 may comprise an oscillator coupled to a transformer which feeds an array of voltage doubling circuits (not shown). An ordinary filter section (also not shown) can be added to decrease ripple distortion in the voltage doubler output and thereby provide a high quality direct current potential on lead 37 which is connected to the appropriate terminals on detector tubes 20 and 23. The high voltage supply circuit is completed through a connection 48 to housing 10 and the shield of the cable 11 to a ground connection 49 at the earth's surface. Similar connections between the detector tubes 20 and 23 and housing 10 complete the operating circuits for these devices.

Low voltage direct current which also is required for the operation of the circuits within housing 10 is provided by a direct current supply 38 at the surface of the earth. The supply 38 is connected through switch 58 to the downhole circuits by way of a bus or common lead 39 in cable 11. Each of the downhole circuits is completed to ground by appropriate connections to the housing 10.

The ionization that characterizes the $He^3(n.p.)H^3$ reactions within detector 20 produce electrical pulses at the output terminals of the detector which are amplified in A channel preamplifier 40 for transmission through lead 41 to A channel pulse height discriminator 42. The pulse height discriminator 42 may be a Schmitt trigger circuit that responds only to those pulses from detector tube 20 that have a height greater than the preamplified minimum value characterizing the aforementioned nuclear events, for example, 5 volts. In this manner noise and other undesirable signals are blocked from further transmission and processing.

Each time the discriminator 42 responds to a pulse from detector tube 20 the discriminator 42 sends a pulse through lead 43 to A channel scaler 44. The scaler 44 is an ordinary arrangement of flip-flop circuits that provide one output pulse through lead 45 to A channel blocking oscillator 46 for each four input pulses from discriminator 42. The downhole scaler 44 prevents pulses from being lost during an overlapping sequence of input pulses, or pile-up, occurring within the resolving time of A channel blocking oscillator 46. The A channel blocking oscillator 46 transmits the scaled pulses to the earth's surface through A channel lead 47 which is coupled to the oscillator 46 by transformer 50.

To complete the description of the downhole instrumentation, output signals from the detector 23 are transmitted through equipment that is substantially identical to that which is used to transmit the A channel pulses to the earth's surface. Accordingly, pulses from the detector tube 23 are transmitted through a path that includes B channel preamplifier 51, B channel discriminator 52, B channel scaler 53, and blocking oscillator 54. The output of B channel blocking oscillator 54 is coupled through transformer 55 to lead 56 in the cable 11 for transmission to the surface of the earth.

On the surface of the earth, the A channel signals which were induced in the secondary winding of transformer 50 are applied to amplifier 60 through lead 47 and coupling transformer 57.

Because the impedance inherent in cable 11 tends to degrade the shape of the transmitted pulses, discrimination between individual pulses in a pulse train often is difficult. Consequently, a pulse shaper 61 is provided to "square up" the output pulses from amplifier 60. This pulse shaper 61 may be a Schmitt trigger circuit.

An additional A channel scaler 62 further scales down the pulses transmitted through channel A in a two to one ratio. Thus, each pulse appearing at the output of A channel scaler 62 represents eight individual neutron-helium reactions within the active volume of detector tube 20 in view of the previous four to one pulse reduction accomplished by A scaler circuit 44 in the housing 10. The output of scaler 62 is transmitted to counter 26 which comprises a sequential array of flip-flop circuits 65–1 to 65–5.

These flip-flop circuits are bistable devices which can be switched into either of two stable states, hereinafter referred to as the "off" or "on" conditions. Two changes of state are required in each of the flip-flop circuits 65–1 to 65–5 to change the state of the next sequentially adjacent flip-flop in the array. The values accorded to the flip-flop circuits 65–1 to 65–5 are, respectively 1, 2, 4, 8 and 16. Thus the total number of scaled pulses received by the counter 26 is determined by adding the values of the "on" flip-flops 65–1 to 65–5 at the time of data readout. For example, if flip-flops 65–1, 65–3 and 65–5 are "on," and circuits 65–2 and 65–4 are "off," the number of counts re-received by the counter 26 is the sum of the values accorded to the "on" flip-flops, namely, $$1+4+16=21$$

Because the 21 pulses received by the counter 26 are scaled by a factor of 8, the 21 counted pulses represent 168 nuclear reactions in the detector tube 20.

Each of the flip-flop circuits in the counter 26 are connected directly to companion flip-flops 30–1 to 30–5 in the storage register 27. The register 27 provides a temporary memory for storing the pulses received by the counter 26. Because counter 26 has five binary stages, it can count a maximum of 32 input pulses before recyling. Inasmuch as register 27 has five binary stages, the register 27 can store a record of 32 scaled A channel pulses.

In accordance with a feature of the invention the ratio of the neutron events occurring in detector tubes 20 and 23 is taken without reference to time as a measurement parameter by a predetermined accumulation of B channel signals.

The scaled signals from the detector tube 23 on channel B are sent from the previously described circuits in the housing 10 through lead 56 in the armored cable 11 to coupling transformer 66 on the surface of the earth. These pulses are then taken from the secondary winding of the transformer 66 by amplifier 67. Output pulses from the amplifier 67 are squared up by pulse shaper 70. B channel scaler 71 which is connected to the output of the pulse shaper 70 further increases the B channel pulse scaling ratio by a factor of 2 to 1. Consequently each output pulse from the B channel scaler 71 represents 8 nuclear events within the detector tube 23. Transfer pulse generator 31 receives these pulses from the scaler 71 and responds to each of these scaled pulses by transmitting a transfer signal to the register 27. The transfer signal enables the sum of the scaled A channel pulses in the flip-flops 65–1 to 65–5 in the counter 26 to be transferred to the register 27. In particular, each transfer pulse acts to set each of the register flip-flops 30–1 to 30–5 to the same condition as the corresponding one of the counter flip-flops 65–1 to 65–5 to which it is connected. The analog output voltage produced by the converter 32 in response to the digital signals stored in register 27 is proportional to the sum of the counts stored in the register.

Continuing with the preceding example in which the counter 26 flip-flops 65–1, 65–3 and 65–5 were in the "on" condition, the corresponding register flip-flops 30–1, 30–3 and 30–5 also are set to the "on" condition by the next occurring transfer pulse. The "on" condition of flip-flop 30–5 (representing 16 scaled counts) produces a voltage component of +3 volts at the output of the converter 32. Flip-flop 30–3 (representing 4 scaled counts, or ¼ of the value represented by flip-flop 30–5) produces a signal component of +0.75 volt at the converter output, while flip-flop 30–1 is accorded ¹⁄₁₆ of the voltage produced by the flip-flop 30–5 in converter 32, or a +0.19 volt component. The converter sends the sum of these voltages, +3.94 volts, to amplifier 72.

The amplifier 72 may be a cathode follower or common emitter circuit which provides no voltage amplification, but some current amplification with a minimum of pulse distortion. The output of the amplifier 72, is of course, the time independent ratio of A channel counts to B channel counts that expresses the spatial distribution of the neutrons irradiating the formation 13.

This ratio signal from the amplifier 72 is recorded on a recording device 73, such as a recording voltmeter or a tape recorder that can be arranged to reproduce the count ratio as a function of the depth of housing 10 within the borehole 12. The ratio developed in this manner then is compared with experimentally derived tables of formation porosities as a function of count ratios or diffusion lengths for the specific formation under investigation. Thus, with the ratio or computed diffusion length as an argument for entering the table, the porosity is uniquely determined for the particular formation.

Illustratively $$N_A = \frac{C_A}{4\pi D} \frac{e^{-R_A/L}}{R_A} \tag{1}$$

Where $N_A$ is the count rate of detector 20; $C_A$ is proportionality constant determined by the physical properties of the neutron detector 20; D is the diffusion constant of the formation under investigation; $R_A$ is the separation between the neutron source 17 and detector 20; and L is the neutron diffusion length in the formation. For neutron detector 23

$$N_B = \frac{C_B}{4\pi D} \frac{e^{-R_B/L}}{R_B} \tag{2}$$

Where D and L are the same as in equation (1); $N_B$ is the count rate of detector 23; $C_B$ is a proportionality constant for the neutron detector 23; and $R_B$ is the separation between the neutron source 17 and detector 23.

$$\frac{N_A}{N_B} = \frac{C_A}{4\pi D} \cdot \frac{4\pi D}{C_B} \cdot \frac{e^{-R_A/L}}{R_A} \cdot R_B e^{R_B/L}$$

$$\frac{N_A}{N_B} = \frac{C_A}{C_B} \frac{R_B}{R_A} e^{(R_B - R_A)/L} \tag{3}$$

Because $C_A$, $C_B$, $R_A$ and $R_B$ are known constants for the particular tool characteristics in question, the neutron diffusion length L for the formation under study is uniquely determined. Using the diffusion length and the composition of the formation, formation porosity in sand and limestone may be determined through the following table of values:

| Formation: | Porosity (Water saturated) | L (cm.) |
|---|---|---|
| SiO₂ (Sand) | 0 | 38.1 |
|  | 18 | 10.5 |
|  | 36.7 | 6.95 |
| CaCO₃ (Limestone) | 0 | 24.1 |
|  | 13 | 10.5 |
|  | 29 | 7.41 |
|  | 43.4 | 6.61 |

For example, a computed diffusion length of 10.5 cm. in a sand formation would show that the sand has a porosity of 18 porosity units. Similar tables for other formation types of interest can be computed by laboratory or field tests on formation specimens of known composition and known porosity.

An additional output signal is taken from transfer pulse generator 31 to reset the counter 26 in order to initiate a new counting cycle. To provide a counter reset or clearing signal, lead 73 connects the output of transfer pulse generator 31 to the delay circuit 74. The clearing signal is delayed sufficiently by the circuit 74 to enable the transfer signal first to transfer the counts stored in the counter 26 to the register 27 in the aforementioned manner. The delayed clearing signal then activates multivibrator 75 which transmits reset pulses through lead 76 to restore the flip-flops 65–1 to 65–5 in the counter 26 to the "off" condition and thereby make the counter ready to receive a new series of A channel pulses.

The neutron population characterized by the pulses from the detector tubes 20 and 23 also can be recorded as individual count rates. As shown in FIGURE 2, A channel pulse shaper 61 provides an input signal through lead 80 to a conventional count rate meter 77. The rate meter 77 can be any suitable device such as a univibrator for transferring input signals to a capacitor, and a resistor connected to the capacitor to develop a voltage-time relationship that is proportional to the A channel count rate. The output signal from the rate meter 77 is sent through lead 84 to an A count rate recorder 85 such as a vacuum tube voltmeter. In a similar manner the B channel pulses also may be obtained as a rate output. The B channel pulse shaper 70 transmits output pulses through lead 86 to B channel count rate meter 87. The count rate meter output signal on lead 91 is recorded in B channel count rate recorder 92 to indicate the formation neutron population detected by the tube 23.

In accordance with one aspect of the invention, the time basis on which the count rates are computed by the A and B channel rate meters 77 and 87 should be the same, or an appropriate correction should be introduced to reduce these count rates to the same time basis, such as counts per second. By reducing these count rates to the same time basis, a ratio of the A count rate to B count rate can be computed manually or by any other suitable means. The identical time factor common to both count rates is cancelled as in the computation $$\frac{S_A}{T} \div \frac{S_B}{T} = \frac{S_A}{S_B}$$

where $S_A$ and $S_B$ are the sums of the A and B channel pulses and T is the time during which the A and B channel pulses are measured.

An alternative method of computing the porosity of a formation under investigation is shown in FIGURE 3. The circuit in FIGURE 3 automatically computes formation porosity in accordance with the following mathematical principles. Taking the natural logarithm of Equation 3

$$\text{Log } K N_A/N_B = \frac{R_B - R_A}{L}$$

where K equals the constant value of $$\frac{C_B R_A}{C_A R_B}$$

therefore $$\text{Log } K + \log N_A - \log N_B = \frac{R_B - R_A}{L}$$

Inasmuch as all terms in these equations are known except the diffusion length L, it follows that L can be computed by subtracting the logarithms of the neutron populations at the detectors 20 and 23. More particularly, because variations in L for any given type of formation material are related to the formation porosity, the circuit output can be presented directly in terms of porosity units by properly taking into account the known constants and the specific formation.

Accordingly, in the manner previously described in connection with FIGURE 2, pulses are transmitted from the neutron detectors 20 and 23 to scalers 62 and 71 respectively in the surface apparatus 19. The output from A channel scaler 62 is sent to a conventional logarithmic rate meter 93 to produce an analog output signal equal to the logarithm of A channel count rate $N_A$. In a similar manner, the output of B channel scaler 71 is sent to logarithmic rate meter 94 which provides an output signal equal to the logarithm of the B channel count rate $N_B$. A subtraction circuit 95 combines the two logarithmic values to produce an analog output signal that corresponds to the logarithm of the ratio of pulses on channel A to those on channel B.

Non-linear signal adjusting means, for example, a set of function former circuits 96 and 96A each of which is individual to a specific formation, such as sandstone or limestone converts the output from subtraction circuit 95 directly to porosity units. Each function former circuit is constructed to provide an input-to-output signal transfer characteristic which corresponds to the relationship between the logarithm of the counting ratio $N_A/N_B$ and the porosity value for a particular one of the formation material types expected to be encountered. Each function former circuit preferably takes the form of an operational amplifier circuit having a resistor-diode type function former network connected into the feed-back circuit thereof. The circuit parameters and biasing of each function former circuit are also chosen so as to take into account the log K and $R_B-R_A$ factors in the equation given above.

As the housing 10 in traversing the borehole 12 starts to measure a new formation, the circuit 96 must be changed to correspond to the formation being measured. By selectively varying the resistances in circuit 96, the response can be modified to provide an analog signal output that corresponds directly to a preselected scale of porosity units.

The output signal from circuit 96 is sent directly to a porosity recorder 97 which could be a recording volt meter calibrated in porosity units.

Although no mechanism is shown either to force the tool housing 10 (FIGURE 2) against one side of the borehole or to position the housing in the center of the borehole, it has been found that a sidewall mounting produces the best results in uncased or open boreholes. Experience indicates, however, that the tool should not be centralized or decentralized forcibly in cased boreholes, such as that which is shown in FIGURE 2, but should be allowed to pass freely through the borehole.

While particular embodiments of the present invention have been shown and described, it is apparent that changes and modifications may be made without departing from this invention in its broader aspects. And, therefore, the aim in the appended claims is to cover all such changes and modifications as fall within the true spirit and scope of this invention.

What is claimed is:

1. A well logging tool comprising a source of neutrons for establishing a neutron population in the vicinity of the tool, a first neutron detector spaced from said source, a second neutron detector relatively more sensitive to the neutron population thereabout than said first detector and spaced from said neutron source a distance at least equal to the distance between the source and the opposite end of said first neutron detector, means for computing the ratio of neutrons detected by said first and second detectors, said computing means having a logarithmic count rate meter responsive to said first neutron detector, another logarithmic count rate meter having the same count rate time constant as said other count rate meter and responsive to said second neutron detector, and subtraction means for taking the difference between said count rate logarithms to provide the ratio of neutrons detected by said first and second detectors.

2. A well logging tool comprising a source of neutrons for establishing a neutron population in the vicinity of the tool, a first neutron detector spaced from said source, a second neutron detector relatively more sensitive to the neutron population thereabout than said first detector and spaced from said neutron source a distance at least equal to the distance between the source and the opposite end of said first neutron detector, means for computing the ratio of neutrons detected by said first and second detectors, said computing means having a logarithmic count rate meter responsive to said first neutron detector, another logarithmic count rate meter having the same count rate time constant as said other count rate meter and responsive to said second neutron detector, subtraction means for taking the difference between said count rate logarithms to provide the ratio of neutrons detected by said first and second detectors, and circuit means for converting said ratio of detected neutrons into a signal correponding to formation porosity.

3. A well logging tool comprising a continuous source of neutrons for establishing a neutron population in the vicinity of the tool, a first neutron responsive detector spaced from said neutron source, a second neutron responsive detector spaced from said neutron source a distance at least equal to the distance between said source and the opposite end of said first detector and relatively more sensitive to the neutron population thereabout than said first detector wherein said first and second detectors are axially aligned in substantially end-to-end abutting relationship, memory means for storing the sum of the neutrons detected by said first detector, means responsive to the second detector for computing the ratio of the sums of the neutrons detected by said first and second detectors, and converter means responsive to said ratio computing means for producing a signal corresponding to said sum of the neutrons detected by said first detector.

4. A well logging tool comprising a continuous source of neutrons for establishing a neutron population in the vicinity of the tool, a first neutron responsive detector spaced from said neutron source, a second neutron responsive detector spaced from said neutron source a distance at least equal to the distance between said source and the opposite end of said first detector and relatively more sensitive to the neutron population thereabout than said first detector, wherein said second detector has a transverse area that is equal generally to the transverse area of the well logging tool, memory means for storing the sum of the neutrons detected by said first detector, means responsive to said second detector for computing the ratio of the sums of the neutrons detected by said first and second detectors, and converter means for producing a signal corresponding to said sum of the neutrons detected by said first detector.

5. A well logging tool comprising a pressure-resistant housing, a source of continuously radiating neutrons in said housing, a first $He^3$ filled neutron detector tube within said housing and spaced axially from said source, another $He^3$ filled neutron detector tube within said housing and spaced axially from said source a distance at least equal to the distance between said source and the opposite end of said first detector tube, said another $He^3$ detector tube having a transverse area approximately coextensive with said housing, a counter responsive to said first tube for receiving signals from said tube, a register operably associated with said counter for storing said received signals, a transfer circuit for receiving pulses from said other tube to emit a signal in response to the received pulses, and recording means connected to said register for displaying the sum of the signals stored in said register in response to said transfer circuit signal.

6. A well logging tool according to claim 5 wherein said first neutron detector tube comprises a transverse area substantially less than the transverse area of said other detector tube and is in end-to-end axial alignment therewith.

References Cited

UNITED STATES PATENTS

| | | | |
|---|---|---|---|
| 2,776,378 | 1/1957 | Youmans | 250—83.6 |
| 2,851,596 | 9/1958 | Hilton | 324—78 |
| 2,971,094 | 2/1961 | Tittle | 250—83.1 |
| 3,200,251 | 8/1965 | Youmans | 250—83.1 |
| 3,234,384 | 2/1966 | Friedling | 250—83.1 |

RALPH G. NILSON, Primary Examiner

M. J. FROME, Assistant Examiner

U.S. Cl. X.R.

250—83.3, 83.6; 324—78